(12) United States Patent
Landrum et al.

(10) Patent No.: US 9,315,200 B1
(45) Date of Patent: Apr. 19, 2016

(54) WIND TURBINE BLADE RAILROAD TRANSPORTATION WITH TWO AXIS TRANSLATION

(71) Applicants: Scott C. Landrum, Southlake, TX (US); T. Christopher King, Keller, TX (US)

(72) Inventors: Scott C. Landrum, Southlake, TX (US); T. Christopher King, Keller, TX (US)

(73) Assignee: Transportation Technology Services, Inc., Southlake, TX (US)

( * ) Notice: Subject to any disclaimer, the term of this patent is extended or adjusted under 35 U.S.C. 154(b) by 0 days.

(21) Appl. No.: 14/606,734

(22) Filed: Jan. 27, 2015

(51) Int. Cl.
*B60P 7/08* (2006.01)
*B61D 3/10* (2006.01)
*B60P 3/40* (2006.01)
*B60P 7/12* (2006.01)

(52) U.S. Cl.
CPC ... *B61D 3/10* (2013.01); *B60P 3/40* (2013.01); *B60P 7/12* (2013.01)

(58) Field of Classification Search
CPC ............... B60P 3/40; B60P 7/12; B61D 3/10
USPC ............... 410/32, 36, 42, 44, 45, 53; 280/404
See application file for complete search history.

(56) References Cited

U.S. PATENT DOCUMENTS

| | | | |
|---|---|---|---|
| 6,983,844 B2 | 1/2006 | O'Kane et al. | |
| 7,303,365 B2 | 12/2007 | Wobben | |
| 7,670,090 B1 | 3/2010 | Landrum et al. | |
| 7,704,024 B2 | 4/2010 | Kootstra et al. | |
| 7,713,007 B2 | 5/2010 | Kootstra | |
| 8,056,203 B2 | 11/2011 | Madsen | |
| 8,096,739 B1 | 1/2012 | Landrum et al. | |
| 8,142,120 B2 * | 3/2012 | Landrum | B60P 3/40 410/44 |
| 8,192,117 B1 | 6/2012 | Landrum et al. | |
| 8,240,962 B2 | 8/2012 | Livingston et al. | |
| 8,342,491 B2 | 1/2013 | Jorgensen et al. | |
| 8,382,407 B1 | 2/2013 | Landrum et al. | |
| 8,602,700 B2 | 12/2013 | Johnson | |
| 8,632,286 B2 | 1/2014 | Wessel et al. | |
| 2014/0050547 A1 | 2/2014 | Hiremath et al. | |

* cited by examiner

*Primary Examiner* — Stephen Gordon
(74) *Attorney, Agent, or Firm* — Dan Brown Law Office; Daniel R. Brown

(57) ABSTRACT

Airfoil transportation using two railcars. A radius arm connects a deck pivot and a bolster pivot, where the deck pivot is coupled to the first railcar to enable arcuate transverse movement of the bolster pivot. A pair of deck stops on either side of the radius arm limit lateral movement of the first bolster pivot. A bolster supports the airfoil and is coupled to the radius arm by the bolster pivot. A wheel assembly under the radius arm carries the weight of the airfoil as it moves laterally. A bolster lock, lock release, and latch operate to hold the bolster in a fixed angular relationship with the radius until the lock release enables rotation at the deck stops positions. The latch holds the radius arm against the deck stop until the bolster returns to the fixed angular position, where the latch releases the radius arm to further translate laterally.

25 Claims, 6 Drawing Sheets

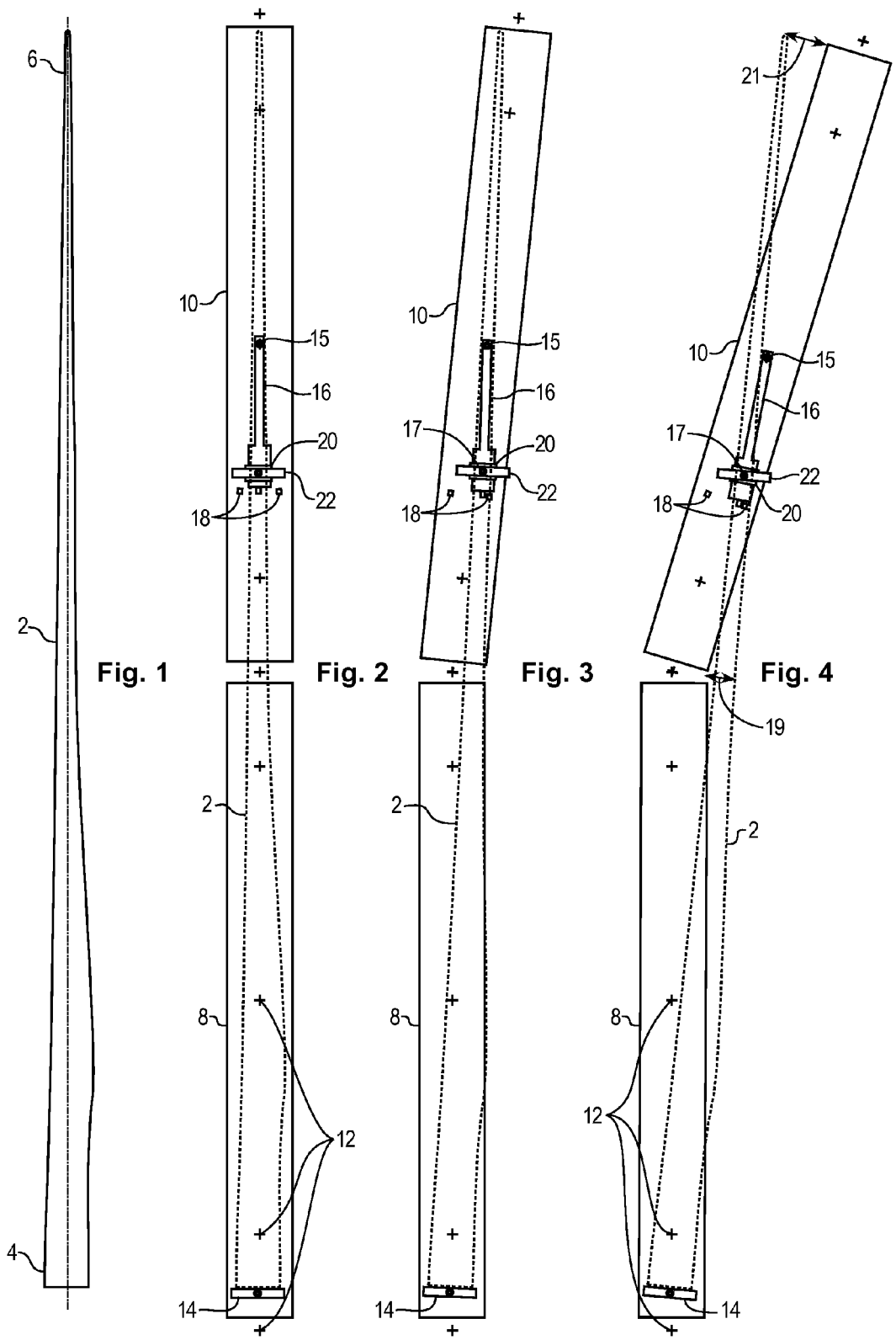

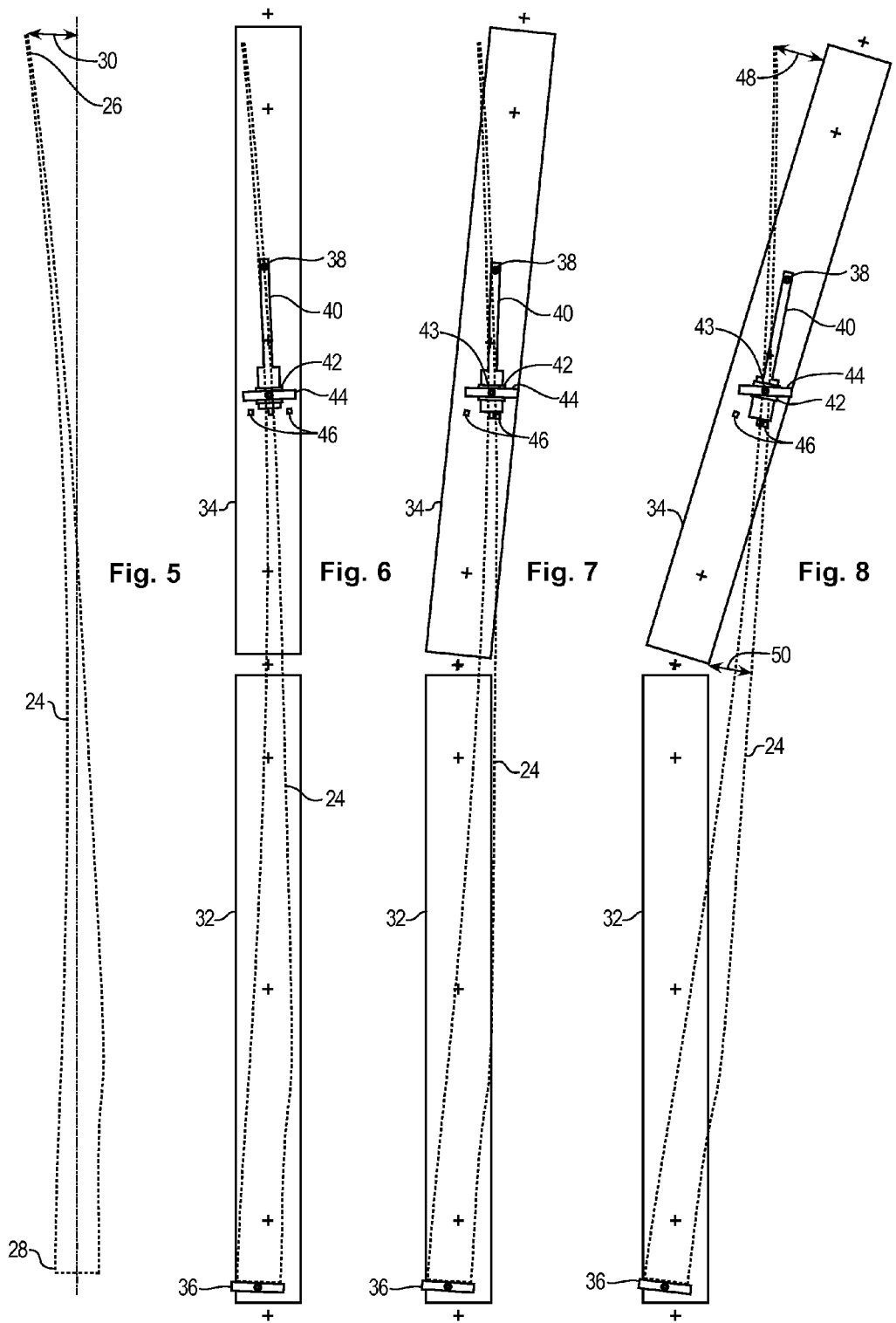

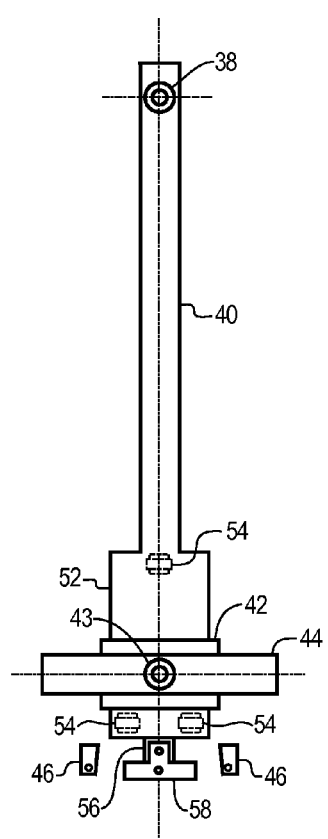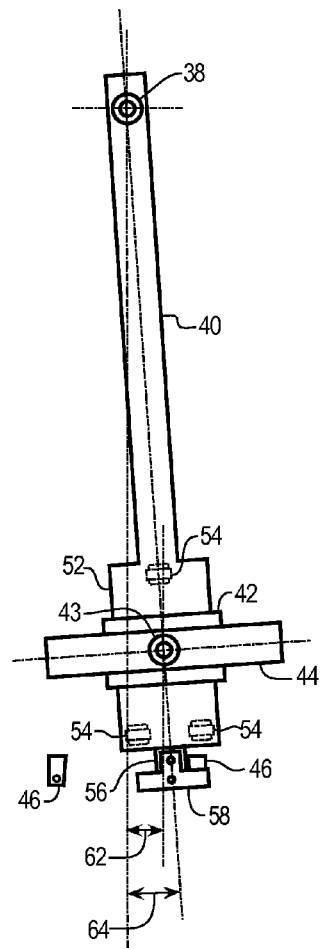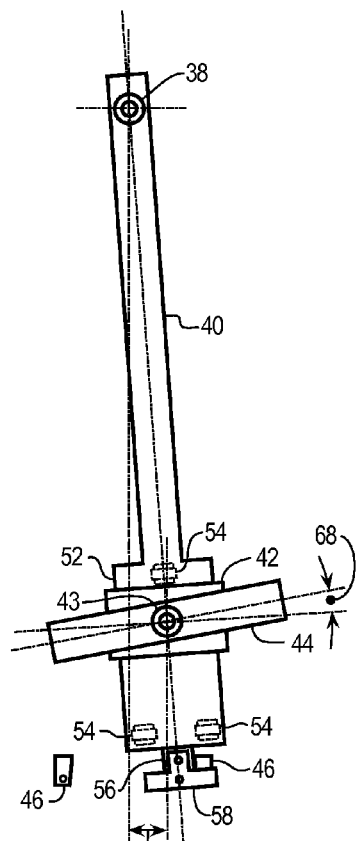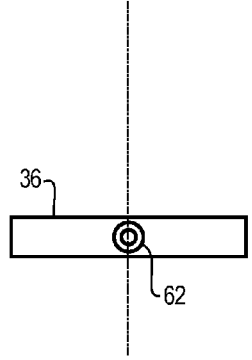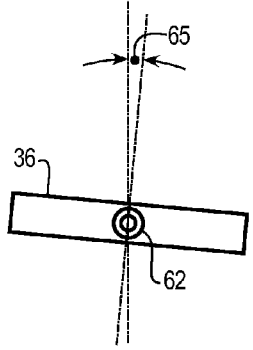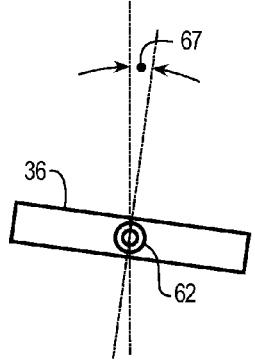
Fig. 9　　　　　　Fig. 10　　　　　　Fig. 11

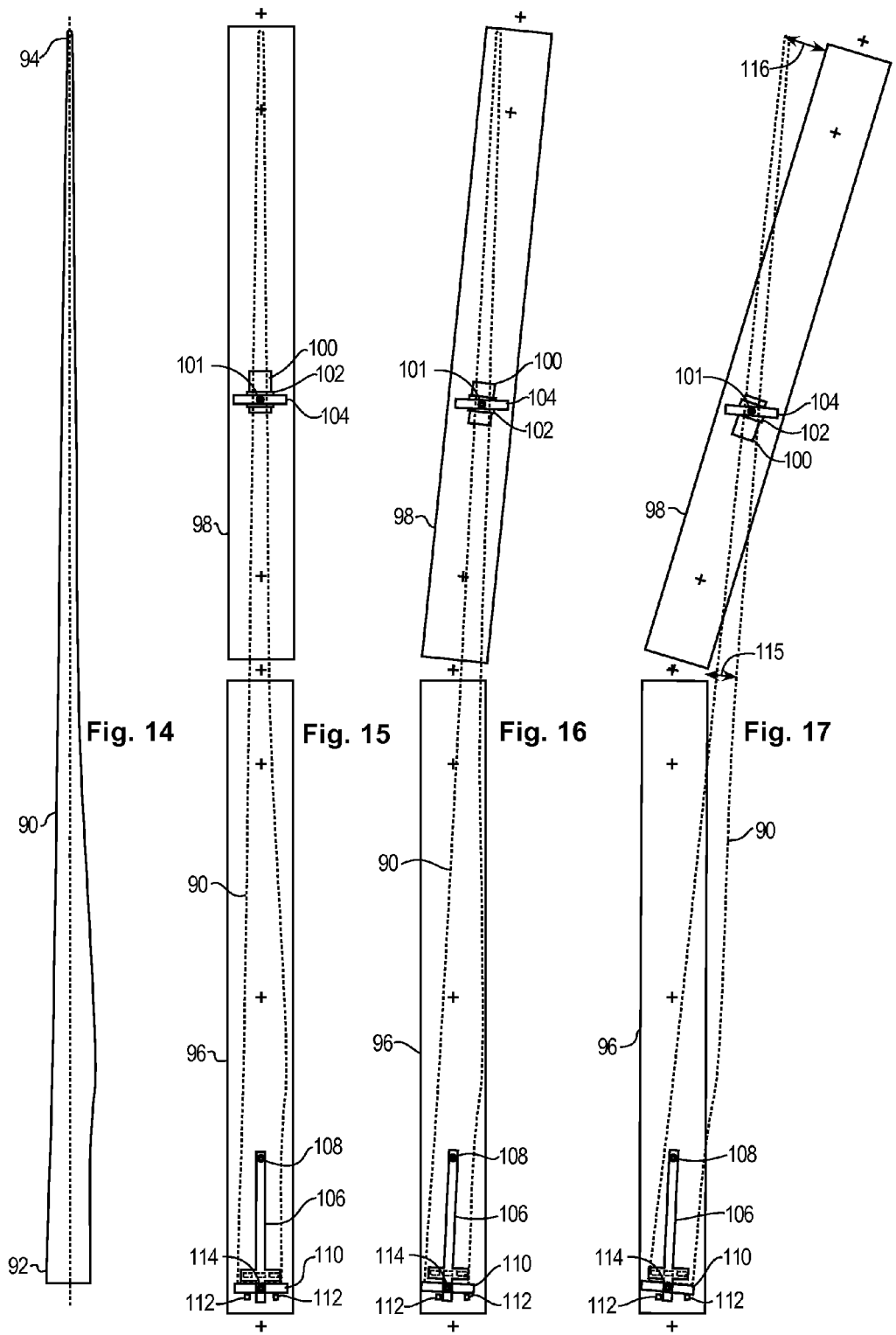

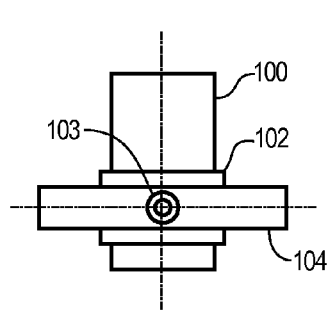
Fig. 18
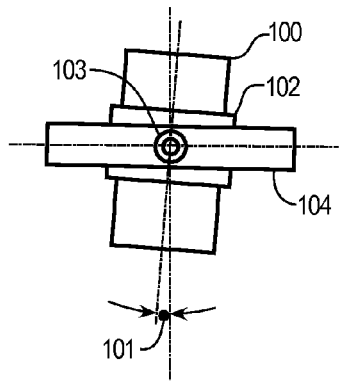
Fig. 19
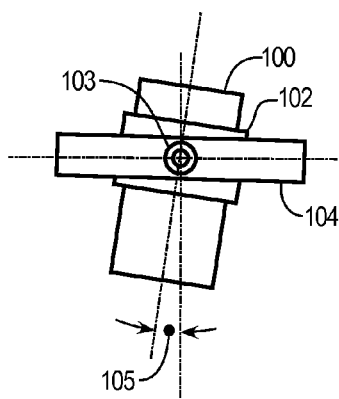
Fig. 20
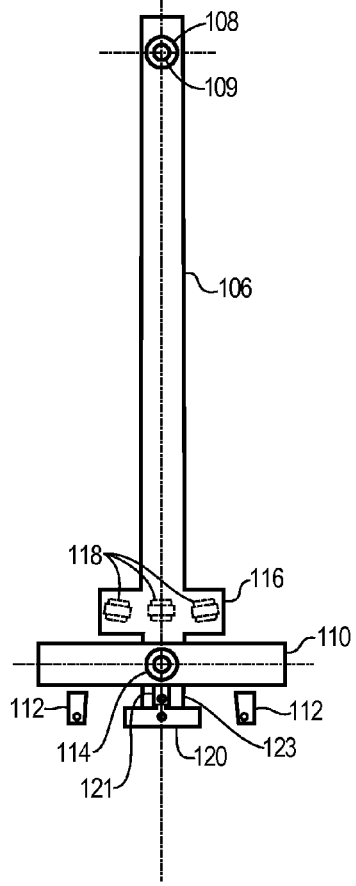
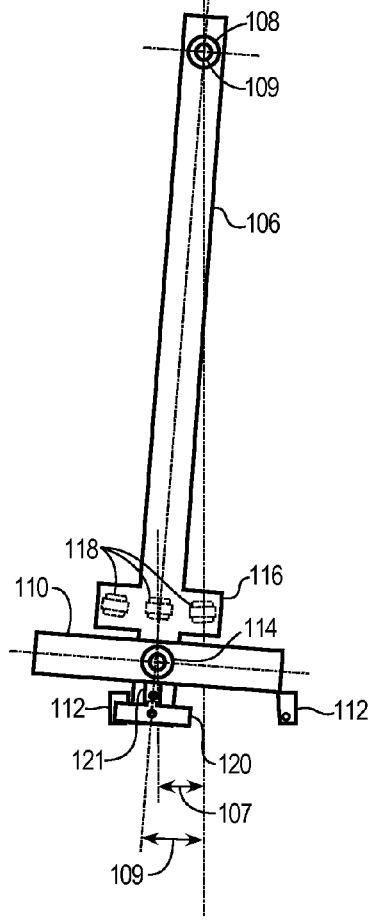
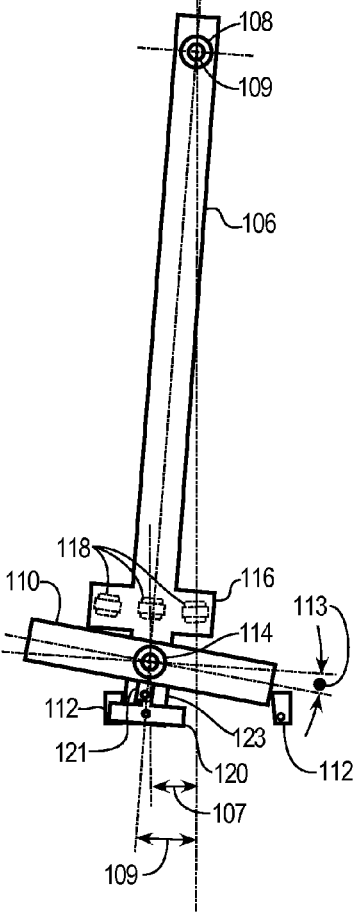

WIND TURBINE BLADE RAILROAD TRANSPORTATION WITH TWO AXIS TRANSLATION

BACKGROUND OF THE INVENTION

1. Field of the Invention

The present invention relates to transporting wind turbine blades. More particularly, the present invention relates to a system and method for transporting long airfoils via railroad using transport fixtures that employ blade position translation through dual rotational axes.

2. Description of the Related Art

The wind generation industry continues to experience growth, including growth in the scale of wind turbine generators. At the time of this writing, wind turbine blades having a length of fifty-five meters are being deployed, and greater lengths are known, and blade length will continue to increase as demands increase. This presents continuing challenges in the filed of logistics, particularly relating to the transport of large and long structures over various transportation modes and through existing infrastructure. Existing infrastructure presents limitations in the allowable clearance through which large and long loads must pass. For example, in the case of railroad transportation, railways present limited rail clearance profiles, which are specified according to the clearance width, clearance height, and other dimensions and capacities. These clearance profile limitations are exacerbated where particularly long structures must traverse curves and are presented with swing-out and overhang extremes that challenge the profile dimensions.

The inventors of the present disclosure have secured a number of US patents covering various aspects of transportation logistics related to wind turbine components. Among these are, by way of example:

U.S. Pat. No. 7,591,621 to Landrum et al. for Wind Turbine Blade Transportation System and Method, issued on Sep. 22, 2009, which presents techniques and fixtures using sliding supports to accommodate blade misalignment during transport.

U.S. Pat. No. 7,670,090 to Landrum et al. for Wind Turbine Blade Transportation System and Method, issued on Mar. 2, 2010, which presents techniques and fixtures using sling supports to accommodate blade misalignment during transport.

U.S. Pat. No. 8,142,120 to Landrum et al. for Large Tower Railroad Transportation System and Method, issued on Mar. 27, 2012, which presents techniques and fixtures for transporting large tower sections.

U.S. Pat. No. 8,366,361 to Landrum for Flange Assembly Railroad Transportation System and Method, issued on Feb. 5, 2013, which presents techniques and fixtures for transporting large flange assemblies.

U.S. Pat. No. 8,708,625 to Landrum et al. for Wind Turbine Blade Railroad Transportation System and Method, issued on Apr. 29, 2014, which presents techniques and fixtures applying gravity tensioning to straighten curved blades during transportation.

The content and disclosure of the foregoing patents are hereby incorporated by reference into the present disclosure.

The increased scale of wind turbine generators is driving the demand for even more creative fixtures and techniques for transporting wind turbine components. In addition, the increasing use of curved wind turbine blades creates additional challenges to logistics engineers. Thus it can be appreciated that there is a need in the art for a system and method to address the problems related to transportation of wind turbine blades, as well as other long and curved airfoil devices, via rail.

SUMMARY OF THE INVENTION

The need in the art is addressed by the systems and methods of the present invention. The present disclosure teaches a system for transporting an airfoil that has a first and second end, utilizing a first railcar coupled to a second railcar. The system includes a radius arm that extends between a first deck pivot and a first bolster pivot, where the first deck pivot is rotatably coupled to the first railcar about a first vertical axis, to enable transverse movement of the first bolster pivot along an arcuate path in either of a first or second transverse direction. The system further includes a first deck stop and a second deck stop, both fixed to the first railcar, that are positioned on either side of the radius arm to limit lateral movement of the first bolster pivot. A first bolster that is configured to support the airfoil adjacent to its first end is rotatably coupled to the radius arm about a second vertical axis by the first bolster pivot. A wheel assembly is disposed between the radius arm and the first rail car to support the weight of the first bolster and the airfoil as they laterally translate between the first and second lateral directions. A bolster lock is disposed between the radius arm and the first bolster to maintain a fixed angular relationship between them, and, a lock release is coupled to disengage the bolster lock, thereby enabling rotation of the first bolster with respect to the radius arm. The first and second deck stops are positioned to actuate the lock release at the limits of movement in the first and second transverse directions, and, a latch is cooperatively coupled with the lock release to maintainably retain the radius arm with either of the first or second deck stops while the bolster lock is disengaged. A second bolster is disposed adjacent to the second end of the airfoil to support the airfoil above the second railcar.

In a specific embodiment of the foregoing system, the bolster lock reengages upon return of the first bolster to the fixed angular relationship with the radius arm, and the lock release further acts cooperatively to release the latch to enable movement of the radius arm and the second bolster away from either of the first or second deck stops. In another specific embodiment, the first deck pivot further includes a pintle and a gudgeon disposed between the first railcar and the radius arm, and, the first bolster pivot further includes an axle and a bearing disposed between the radius arm and the first bolster.

In a specific embodiment of the foregoing system, the wheel assembly further includes plural wheels fixed to the radius arm that are oriented and aligned to roll along the arcuate path. In another specific embodiment, the system further includes a bearing plate fixed to the first railcar upon which the wheel assembly rolls. In another specific embodiment of the foregoing system, the second bolster further includes a second bolster pivot disposed between the second railcar and the second bolster to accommodate airfoil alignment changes as the first and second railcars traverse a railroad.

In specific embodiment, the foregoing system further includes a slide assembly disposed between the second railcar and the second bolster, which enables longitudinal movement of the second bolster with respect to the second railcar, thereby allowing for changes in distance between the first bolster and the second bolster that occur as the first and second railcars traverse a railroad. In another specific embodiment, the foregoing system further includes a slide assembly disposed between the radius arm and the first bolster, which enables longitudinal movement of the first bolster with respect to the first railcar, thereby allowing for changes in distance between the first bolster and the second bolster that occur as the first and second railcars traverse a railroad. In a refinement to this embodiment, the slide assembly is disposed between the radius arm and the first bolster pivot. In another refinement to this embodiment, the slide assembly is disposed between the first bolster pivot and the first bolster.

In a specific embodiment of the foregoing system, the first end of the airfoil is the root end, and the second end of the airfoil is the tip end. In another specific embodiment, the first end of the airfoil is the tip end and the second end of the airfoil is the root end. In another specific embodiment, the first deck pivot is positioned between the first bolster pivot and the second bolster. In another specific embodiment, the first bolster pivot is positioned between the first deck pivot and the second bolster. In another specific embodiment, a third railcar is disposed between the first railcar and the second railcar.

The present invention also teaches a method for transporting an airfoil having a first and second end, utilizing a first and second railcar coupled together. The method includes the steps of connecting a deck pivot to the first railcar, and connecting the deck pivot to a radius arm about a first vertical axis, where the radius arm extends from the first deck pivot to a first bolster pivot, which thereby enables transverse movement of the first bolster pivot along an arcuate path in either of a first or second transverse direction. The method further includes attaching a first and second deck stop to the first railcar on either side of the radius arm, which thereby limits the lateral movement of the first bolster pivot. Also, attaching a first bolster to the first bolster pivot about a second vertical axis, and supporting the airfoil with the first bolster adjacent to the first end. The method further includes positioning a wheel assembly between the radius arm and the first rail car, thereby supporting weight of the first bolster and the airfoil as they are laterally translating between the first and second lateral directions, and, disposing a bolster lock between the radius arm and the first bolster, thereby maintaining a fixed angular relationship therebetween. Further, positioning a lock release such that the first and second deck stops actuate the lock release when the radius arm reaches the limits of movement in the first and second transverse directions, and wherein the lock release actuation disengages the bolster lock, thereby enabling rotation of the first bolster with respect to the radius arm. Then, cooperatively coupling a latch with the lock release for maintainably retaining the radius arm with either of the first or second deck stops while the bolster lock is disengaged. Finally, supporting the second end of the airfoil above the second railcar by attaching a second bolster to the second railcar adjacent to the second end of the airfoil.

In a specific embodiment, the foregoing method further includes reengaging the bolster lock upon returning the first bolster to the fixed angular relationship with the radius arm, and, cooperatively releasing the latch for enabling movement of the radius arm and the second bolster away from either of the first and second deck stops. In another specific embodiment, wherein the wheel assembly includes plural wheels, the method further includes orienting the plural wheels for rolling along the arcuate path.

In a specific embodiment, the foregoing method further includes attaching a bearing plate to the first railcar, and rolling the wheel assembly on the bearing plate. In another specific embodiment, the foregoing method further includes connecting a second bolster pivot between the second railcar and the second bolster, thereby accommodating airfoil alignment changes as the first and second railcars traverse a railroad.

In a specific embodiment, the foregoing method further includes connecting a slide assembly between the second railcar and the second bolster, thereby enabling longitudinal movement of the second bolster with respect to the second railcar, and allowing for changes in distance between the first bolster and the second bolster that occur as the first and second railcars traverse a railroad. In another specific embodiment, the foregoing method further includes connecting a slide assembly between the radius arm and the first bolster, thereby enabling longitudinal movement of the first bolster with respect to the first railcar, and allowing for changes in distance between the first bolster and the second bolster that occur as the first and second railcars traverse a railroad.

In a specific embodiment, the foregoing method further includes positioning the first deck pivot between the first bolster pivot and the second bolster. In a specific embodiment, the foregoing method further includes positioning the first bolster pivot between the first deck pivot and the second bolster. In a specific embodiment, the foregoing method further includes coupling a third railcar between the first railcar and the second railcar.

BRIEF DESCRIPTION OF THE DRAWINGS

FIG. 1 is a drawing of a wind turbine blade according to an illustrative embodiment of the present invention.

FIG. 2 is a drawing of a train carrying a wind turbine blade according to an illustrative embodiment of the present invention.

FIG. 3 is a drawing of a train carrying a wind turbine blade according to an illustrative embodiment of the present invention.

FIG. 4 is a drawing of a train carrying a wind turbine blade according to an illustrative embodiment of the present invention.

FIG. 5 is a drawing of a wind turbine blade according to an illustrative embodiment of the present invention.

FIG. 6 is a drawing of a train carrying a wind turbine blade according to an illustrative embodiment of the present invention.

FIG. 7 is a drawing of a train carrying a wind turbine blade according to an illustrative embodiment of the present invention.

FIG. 8 is a drawing of a train carrying a wind turbine blade according to an illustrative embodiment of the present invention.

FIG. 9 is a drawing of a blade mounting fixture assembly according to an illustrative embodiment of the present invention.

FIG. 10 is a drawing of a blade mounting fixture assembly according to an illustrative embodiment of the present invention.

FIG. 11 is a drawing of a blade mounting fixture assembly according to an illustrative embodiment of the present invention.

FIG. 14 is a drawing of a wind turbine blade according to an illustrative embodiment of the present invention.

FIG. 15 is a drawing of a train carrying a wind turbine blade according to an illustrative embodiment of the present invention.

FIG. 16 is a drawing of a train carrying a wind turbine blade according to an illustrative embodiment of the present invention.

FIG. 17 is a drawing of a train carrying a wind turbine blade according to an illustrative embodiment of the present invention.

FIG. 18 is a drawing of a blade mounting fixture assembly according to an illustrative embodiment of the present invention.

FIG. 19 is a drawing of a blade mounting fixture assembly according to an illustrative embodiment of the present invention.

FIG. 20 is a drawing of a blade mounting fixture assembly according to an illustrative embodiment of the present invention.

DESCRIPTION OF THE INVENTION

Figure 12:
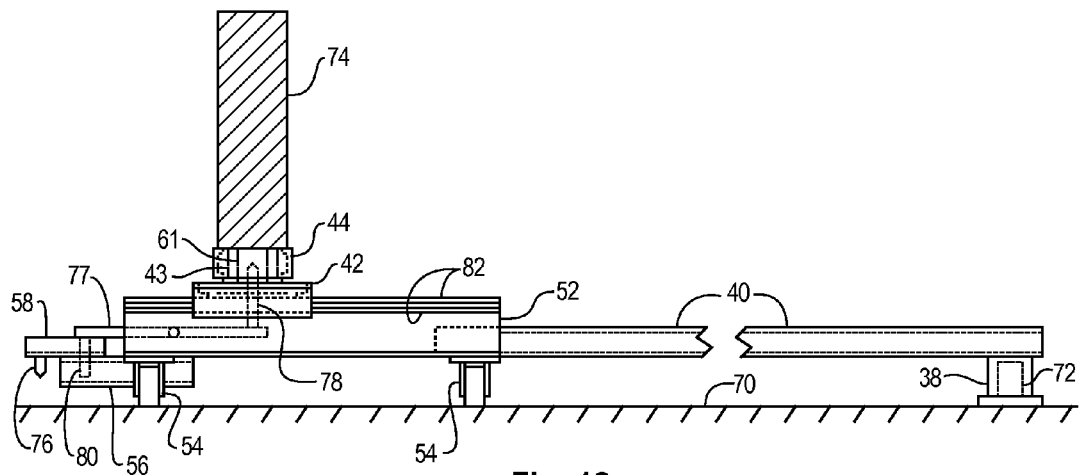
FIG. 12 is a side view drawing of a blade mounting fixture according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The teachings herein address the problems associated with transporting large wind turbine blades, other large airfoils, and other long structures via railroad, or by other modes of transportation where lateral clearance may be an issue. The illustrative embodiments presented are principally directed to wind turbine blades, however they are applicable to any large airfoil or similarly structured devices. Such airfoils and devices share the characteristic of a rigid root end that is designed with sufficient strength to support the entire airfoil and accommodate the flexing and stresses involved during operation thereof. Such airfoils are typically tapered through a midsection to a tip end, and, in modern designs the tip end of the airfoil is curved away from a centerline drawn perpendicularly through the root end flange. The section modulus of the airfoil gradually decreases from the root end to the tip end. Generally, the strength profile of the airfoil decreases from the root end to the tip end as well.

In considering the need to support an airfoil during transportation, it will be appreciated that the airfoil will typically lie in a substantially horizontal orientation, and require two or more support locations. During the transportation of an airfoil, the stresses and bending loads are quite different that those encountered during normal operation. The root end of the airfoil will almost certainly have sufficient strength as a support location during transportation, and the tip end will most likely not have sufficient strength as a support location. Along some region between the root end and the tip end, there will exist sufficient strength to support the airfoil during transportation, and this region will be referred to herein as the midsection. The specific location of the midsection will vary from airfoil to airfoil. In some designs, it may be a narrowly specified portion of the airfoil length that the manufacturer has reinforced to bear transportation loads. In other designs, the midsection may be a broader region between the root end and the tip end. Note, however, that when this disclosure discusses supporting an airfoil from the tip end, what is meant is supporting along the midsection adjacent to the tip end, as opposed to supporting the root end.

At the time of this writing, certain large wind turbine blades having a length of approximately 55 meters are in service, and larger blades having a length exceeding 55 feet are now being deployed. The longer turbine blade have a more exaggerated tip curvature, which is generally straightened during operation in the presence of stronger winds loads. This serves to insure adequate clearance with respect to the wind turbine support tower. It is expected that wind turbine blades having even longer lengths will be deployed in the future. However, the longest standard rail flatcars that are readily available have a deck length of approximately 89 feet, and a coupler-to-coupler length of approximately 94 feet. This dictates that large airfoils must overhang the length of a railroad flatcar during transportation. Prior loading systems have used two fixed and rigid support locations at either end of a single railcar, one supporting the root end of the wind turbine blade and another supporting the wind turbine blade along its midsection, with the tip of the blade extending beyond one end of the railcar. The railcar supporting the wind turbine blade is referred to as the "load" car. The second railcar, over which the tip end extends, is referred to as an idler car.

As the length of turbine blades has increased, designers have placed a root support on a first railcar and a midsection support on a second railcar. The use of three railcars is also considered to accommodate airfoils that are longer then two railcars. A critical factor in employing such a loading system is to address the alignment issues as a train rounds a short radius curve. Main line railroads may have curves as tight as 13 degrees, and some switching yards may have even shorter radius curves, perhaps as tights as 23 degrees. The inventors and assignee of the present invention have addressed such alignment issues at some length in a number or prior US patents, discussed in the Background of the Invention section of this disclosure. In particular, note U.S. Pat. No. 7,591,621 to Landrum et al., issued Sep. 22, 2009 for Wind Turbine Blade Transportation System and Method, U.S. Pat. No. 7,670,090 to Landrum et al. for Wind Turbine Blade Transportation System and Method, and U.S. Pat. No. 8,708,625 to Landrum et al., issued on Apr. 29, 2014, for Wind Turbine Blade Transportation System and Method. The contents of these disclosures are hereby incorporated by reference thereto. All of these disclosures employ load support structures that flex, slide, or straighten the blade in order to address changes in position of the blade as compared to the railcars as they transition from straight railway tracks through curved railway tracks. They also address some issues related to keeping the turbine blade within the railroad track clearance profile.

In loading and transporting a long wind turbine blade, engineers must consider the center of gravity of the blade as compared to the centerline of the railcars, the strength profile of the blade, the alignment of the blade as the railcars traverse curves in the railway, the changes in distance between the support locations, the alignment of the blade in regards to the support fixtures, the overhang distance of the blade, and the sag and summit of the blade and cars as the railway undulates in vertical directions. In the final analysis, the engineer's goal is to keep the blade within the railroad clearance profile, or at least limit the deviation outside of the clearance profile as much as possible, thereby enabling such a load to transit as much railway track segments as possible.

The prior art blade loading fixtures have addressed angular misalignment between the blade and support fixtures by providing flexibility in the supporting connections. The prior art has also provided certain means to translate the support location laterally across the deck of the railcar, thereby somewhat controlling blade overhang and swing-out outside of the railway clearance profile. However, as blade lengths increase, these measure are becoming less capable of controlling blade swing-out, and further measures are needed to increase the amount of railway tracks that accommodate these longer blades. The present disclosure substantially advances the art by providing a two-axis translating blade support, which not only improves performance over the prior art, but also enables logistics engineers to fine tune the transport fixtures according to the blade design, railcars employed, and tracks involved in a particular transportation task.

The present disclosure teaches a two-axis translation mount that can be applied to the root end or the tip end support, or both, and which controls blade swing-out with increasing effectiveness as the degree of track curvature increases. Two rotational axes are separated by a radius arm to enable the lateral translation movement of the blade mount location. This two-stage rotation operation allows additional clearances on a mainline track, where the degree of tack curvature is lower, to be optimized in the first stage, but also allows the system to accommodate tighter curves found off of main-line tracks, in the second stage. The location of the first axis and length of the radius arm enable the system to be tuned. The teachings are applicable in a wide range of load configuration, but are particularly applicable for longer blades, where prior art setups result in clearance problems that can prevent rail transport altogether. One embodiment of the present teachings consists of conventional rotating root bolster and a reduced pivot tip end bolster, using a radius arm, which incorporates a mechanism limiting travel to keep the tip frame within the deck of the railcar. The length of the radius arm can be varied to tune the system to provide optimal clearances on a certain track curvatures. Once the lateral travel of the radius arm is exhausted, a mechanism allows the top plate supporting the root or tip to unlock and continue to rotate without further rotation of the radius arm. The rotation is initiated and controlled by the underlying railcar as it traverses a curve and acts against the stiffness of the blade, which is held firmly at root and tip.

In one embodiment of the teachings herein, the clearance concerns involve curves of eight degrees or less, but can be designed to accommodate up to twenty-three degree curves, because curves that tight are found on industry tracks. By using all of the translational travel of the radius arm to affect the blade on curves of eight degrees or less, but still allowing non-translational rotation above that curvature, the system of the present disclosure addresses the widest range of track curvatures possible, greatly exceeding prior art designs. In this embodiment, the root mount consists of a radius arm pinned to a flatcar deck at a first end at a first axis. At a second end of the radius arm is pinned to a support arm at a second axis. The support arm typically is a bolster for supporting the load. In its 'normal' position, the support arm is orthogonal to the extension arm. The support arm is bolted to the root end of the blade. There is a second blade support out near the tip end, which is a substantially rigid mount. Starting in the 'normal' position, traversing a straight track, the radius arm and support arm are fixed at right angle to one another. As the train enters a curve, the tip end support moves off centerline, which causes the blade to rotate about the first axis, since its lateral position with respect to the car is controlled by the root mount and tip mount. This action is self-correcting as the train returns to a straight section of track, provided that the 2nd axis remains locked. As the degree or curvature increases, the first axis of the root mount reaches a degree of rotation, and the lock mechanism disengaged the fixed relationship of the radius are to support arm, enabling rotation about the second axis. The specific degree of rotations is constrained by the stiffness of the blade, just as the first rotation is constrained. In other words, it can only rotate in response to the reaction of the blade as the cars enter and exit the curve. There is no continuing rotation when the cars are fully on a constant curve. As the track straightens out, the rational movement returns to the normal, straight-away, position.

There is a limit on the rotation of the first axis to prevent the root end from swinging out past the railroad clearance limit, which is typically about nine to ten feet according to the clearance profile. This is accomplished using 'stops' welded to the flatcar deck to limit rotation of the radius arm. The stop for the radius arm can also be the trigger for the second stage. The length of the pivot arm and location of the stop dictate the performance of the system, allowing it to be tuned to the maximum expected mainline curve with an optimal clearance profile. The stop and second stage trigger incorporate a locking mechanism to prevent uncontrolled rotation. Once the radius arm hits the hard stop, the pivot arm is latched and the second stage is unlocked. The arm latching and second stage pivot release reverses as the cars move out of the curve. There are a number of options for accomplishing these functions, as will be appreciated by those skilled in the art having access to the teachings herein.

One option is to use a rotating root bolster and a tip radius arm with roughly equal lateral swing from side-to-side and a clearance profile of 16'-4" in both directions. This requires another stage of motion to be designed into the top plate of the radius arm to allow the blade tip support to rotate once the radius arm reaches the end of its lateral travel, which is optimized for a thirteen degree curve in one embodiment. Another option is to use a rotating root bolster and a tip radius arm with a very short travel and a clearance profile of 16'-4" in both directions. Testing is required to tune the design to determine how far outboard the tip swings on sharper curves to see what degree of second axis rotation would be required, particularly considering the curvature of the blade in question. The second stage can be as simple as having the blade tip or root mounted on casters that sit in a 'V'-groove of sufficient angularity to force the single stage to act until hitting a hard stop, then having the casters climb the incline for the second stage. The second stage could have a six inch pipe acting as a pintle in the middle that fits within another pipe, acting as a gudgeon, to maintain centricity while the second stage is rotating. Once the cars began to come out of the curve, the casters would roll down the incline until stopping in the 'V' and then the first stage would begin moving again. Those skilled in the art will appreciate that more complex designs that accomplish the same function can be implemented. For example, a spring loaded arm or pin that is triggered at the hard stop to hold the first stage and release a latch on the second stage. Once the cars begin to come off the curve and the second stage reaches the neutral position, rotation of the second stage would reset the lock and unlock the first stage. It could also be a two-part latch on a common spring where the first stage lock has a head beveled in both directions, so that enough force in either direction will engage the first stage lock and disengage the second.

Reference is directed to FIG. 1, which is a drawing of a straight wind turbine blade 2 according to an illustrative embodiment of the present invention. While the use of straight blades is on the decline, this is an example of a wind turbine blade that follows a straight centerline contained fully within the blade 2. Note the root end 4 and the tip end 6. Also note that this blade 2 cannot be supported from the tip end directly, and that "tip end support" is actually accomplished by placing a bolster at some location between the root 4 and tip 6, which varies from blade to blade, and is sometimes referred to as the midsection. The root end 4 of this blade can be supported directly by placing a bolster at that location. This blade 2 will be used as an exemplar with respect to FIGS. 2, 3, and 4.

Reference is directed to FIG. 2, FIG. 3, and FIG. 4, which are drawings of a train carrying a wind turbine blade 2 through varying degrees of curvature according to an illustrative embodiment of the present invention. FIG. 2 is a straight track, FIG. 3 is an eight-degree curve, and FIG. 4 is a twenty-three degree curve. The train consists to two flatcars 8, 10 that are coupled together and traverse a railroad (not shown). Note that the location of the couplers, trucks, and centers of the railcars are indicated by "+" symbols 12 as points of reference useful to those skilled in the art. In FIG. 2, the flatcars 8, 10 are traversing a straight section of track. A root bolster 14 supports the blade 2 above the first flatcar 8. The tip end of the blade 2 is supported above the second flatcar 10 using a radius arm 16 that is rotatably connected to the flatcar 10 about a deck pivot 15 along a vertical axis. A slide assembly 20 engages the radius arm 16, and is enabled to slide in a generally fore-aft longitudinal direction. A bolster 22 is disposed on top of the slide assembly 20, which engages and supports the tip end of the blade 2 over the second flatcar 10. Note that the blade 2 generally lies along the center of the flatcars 8, 10 as they traverse straight track. Also note that deck stops 18 are positioned on either side of the radius arm 16 to limit the lateral travel of the radius arm 16 as it rotates about deck pivot 15. The radius arm 16 is generally aligned with the longitudinal centerline flatcar 10 as it travels on a straight track by virtue of the stiffness of the blade 2, which is held in position by the root bolster 14 and the tip end bolster 22.

FIG. 3 illustrates the same train as FIG. 2, but in FIG. 3, the track (not shown) has an eight-degree curve so the flatcars 8, 10 are no longer aligned in a straight line. The blade 2 defines a straight line between the root bolster 14 and the tip end bolster 22. The tip end bolster 22 firmly engages the blade 2. Since the tip end bolster is locked in a fixed angular relationship with the slide assembly 20 and radius arm 16, the group of these items are forced to rotate about the deck pivot point 15, as illustrated. This action drives the tip end of the blade 2 toward the outside of the curve and the middle of the blade 2 toward the inside of the curve. Note that the blade overhang remains within the width of the flatcars 8, 10, so there are no profile clearance issues at this point. Also note that the end of the radius arm 16 is just beginning to engage one of a pair of deck stops 18 that are fixed to the deck of the second flatcar 10. When the radius arm 16 fully engages the deck stop 18, a lock release (not shown) is actuated, which enables the tip end bolster 22 to rotate with respect to the slide assembly 20 and the radius arm 16 about a bolster pivot 17. Also note in FIG. 3 that the bolsters 14, 22 firmly hold the blade 2. This implies that the distance between the bolsters 14, 22 is a fixed length. Since the triangulation that occurs by virtue of the misalignment of the cars 8, 10 shortens the distance between the components fixed to the cars, there must be some longitudinal accommodation. The slide assembly 20 addresses this length change, and FIGS. 2, 3, and 4 illustrated this movement. The adjustment length of the slide assembly 20 is also tuned for the particular embodiment.

FIG. 4 follows FIG. 2 and FIG. 3, and FIG. 4 illustrated the cars 8, 10 as they traverse a twenty-three degree curvature in the track (not shown). In this drawing, the radius arm 16 has fully engaged one of the deck stops 18, so a lock release (not shown) has released a bolster pivot 17 to enable the tip end bolster 22 to rotate with respect to the slide assembly 20 and the radius arm 16. In addition, a latch (not shown) is cooperatively coupled with the lock release, and maintains the radius arm 16 against the deck stop 18. Thus, the radius arm 16 cannot rotate about the deck pivot 15 while the bolster 22 is allowed to rotate about the bolster pivot 17. Note that that the blade 2 overhangs at the tip end 21 and along the middle 19. These distances are reduced as compared to the same blade where the tip end bolster is not allowed to rotate about the bolster pivot 17. The length of the radius arm 16 and the location of the deck pivot 15 are tuned by logistics engineers to control these two overhangs 19, 21 to enable the least detrimental configuration from a railroad clearance profile perspective. When the flatcars 8, 10 return to a straight section of track, the tip end bolster 22 returns to the fixed angular relationship with the radius arm 16, and radius arm is then urged away from the deck stop 18, and this action releases the aforementioned latch and reengages the aforementioned lock. In this manner, the system is enabled to transition between straight and curved track sections and automatically control the rotation about the deck pivot 15 and the bolster pivot 17.

Reference is directed to FIG. 5, which is a drawing of a curved wind turbine blade 24 according to an illustrative embodiment of the present invention. The use of curved wind turbine blades is on the increase as airfoils become longer because this design addresses an issue with regard to blade flex under load. The curve moves the tip 26 of the blade away from the wind turbine tower so that when the blade 24 flexes under load, the tip end 26 is still held with adequate clearance from the tower. Note the root end 28 and the tip end 26, which curves a distance 30 away from the centerline. Also note that this blade 24 cannot be supported from the tip end directly, and that "tip end support" is actually accomplished by placing a bolster at some location between the root 28 and tip 26, which varies from blade to blade, and is sometimes referred to as the midsection. The root end 28 of this blade can be supported directly by placing a bolster at that location. This blade 24 will be used as an exemplar with respect to FIGS. 5, 6, and 7.

Reference is directed to FIG. 6, FIG. 7, and FIG. 8, which are drawings of a train carrying a wind turbine blade 24 through varying degrees of curvature according to an illustrative embodiment of the present invention. FIG. 6 is a straight track, FIG. 7 is an eight-degree curve, and FIG. 8 is a twenty-three degree curve. The train consists to two flatcars 32, 34 that are coupled together and traverse a railroad (not shown). Note that, in a similar manner discussed with respect to FIG. 3, the location of the couplers, trucks, and centers of the railcars are indicated by "+" symbols on drawing FIGS. 5, 6, and 7, as points of reference useful to those skilled in the art. In FIG. 6, the flatcars 32, 34 are traversing a straight section of track. A root bolster 36 supports the blade 24 above the first flatcar 32. The tip end of the blade 24 is supported above the second flatcar 34 using a radius arm 40 that is rotatably connected to the flatcar 34 about a deck pivot 38 along a vertical axis. A slide assembly 42 engages the radius arm 40, and is enabled to slide in a generally fore-aft longitudinal direction. A bolster 44 is disposed on top of the slide assembly 42, which engages and supports the tip end of the blade 24 over the second flatcar 34. Note that the blade 24 generally lies over the central area of the flatcars 32, 34 as they traverse straight track. It is important for the center of mass of the airfoil 24 to be generally centered on the centerline of the railcars 32, 34. Also note that deck stops 46 are positioned on either side of the radius arm 40 to limit the lateral travel along an arcuate path of the radius arm 40 as it rotates about deck pivot 38. The radius arm 40 is generally aligned with the longitudinal centerline flatcar 34 as it travels on a straight track by virtue of the stiffness of the blade 24, which is held in position by the root bolster 36 and the tip end bolster 44.

FIG. 7 illustrates the same train as FIG. 6, but in FIG. 7, the track (not shown) has an eight-degree curve so the flatcars 32, 34 are no longer aligned in a straight line. The blade 24 defines a connecting line between the root bolster 36 and the tip end bolster 44. The tip end bolster 44 firmly engages the blade 24. Since the tip end bolster 44 is locked in a fixed angular relationship with the slide assembly 42 and radius arm 40, the group of these items are forced to rotate about the deck pivot point 36, as illustrated. This action drives the tip end of the blade 24 toward the outside of the curve and the middle of the blade 24 toward the inside of the curve, as illustrated. Note that the blade overhang extends just a small amount over the edge of the railcars 32, 34, so there are no profile clearance issues with degree of curvature. Also note that the end of the radius arm 40 is just beginning to engage one of a pair of deck stops 46 that are fixed to the deck of the second flatcar 34. When the radius arm 40 fully engages the deck stop 46, a lock release (not shown) is actuated, which enables the tip end bolster 44 to rotate with respect to the slide assembly 42 and the radius arm 40 about a bolster pivot 43. Also note in FIG. 7 that the bolsters 36, 44 firmly hold the blade 24. This implies that the distance between the bolsters 36, 44 is a fixed length. Since the triangulation that occurs by virtue of the misalignment of the cars 32, 34 shortens the distance between the components fixed to the cars, there must be some longitudinal accommodation. The slide assembly 42 addresses this length change, and FIGS. 6, 7, and 8 illustrate this movement. The adjustment length of the slide assembly 42 is also tuned for the particular embodiment.

FIG. 8 follows FIG. 6 and FIG. 7, and FIG. 8 illustrated the cars 32, 34 as they traverse a twenty-three degree curvature in the track (not shown). In this drawing, the radius arm 40 has fully engaged one of the deck stops 46, so a lock release (not shown) has released a bolster pivot 43 to enable the tip end bolster 44 to rotate with respect to the slide assembly 42 and the radius arm 40. In addition, a latch (not shown) is cooperatively coupled with the lock release, and maintains the radius arm 40 against the deck stop 46. Thus, the radius arm 40 cannot rotate about the deck pivot 38 while the bolster 44 is allowed to rotate about the bolster pivot 43. Note that that the blade 24 overhangs at the tip end 48 and along the middle 50. These distances are reduced as compared to the same blade where the tip end bolster is not allowed to rotate about the bolster pivot 43. The length of the radius arm 40 and the location of the deck pivot 38 are tuned by logistics engineers to control these two overhangs 48, 50 to enable the least detrimental configuration from a railroad clearance profile perspective. When the flatcars 32, 34 return to a straight section of track, the tip end bolster 44 returns to the fixed angular relationship with the radius arm 40, and radius arm is then urged away from the deck stop 46, and this action releases the aforementioned latch and reengages the aforementioned lock. In this manner, the system is enabled to transition between straight and curved track sections and automatically control the rotation about the deck pivot 38 and the bolster pivot 43.

Reference is directed to FIG. 9, FIG. 10, and FIG. 11, which are drawings of blade mounting fixture assemblies according to an illustrative embodiment of the present invention. FIGS. 9, 10, and 11 generally comport with the embodiment illustrated in FIGS. 6, 7, and 8. FIG. 9 illustrates an angular configuration on a straight track, FIG. 10 illustrates an angular configuration on an eight-degree curve, and FIG. 11 illustrates an angular configuration on a twenty-three degree curve. The root end bolster 36 is fixed to the deck of railcar 32 (not shown) through a root pivot 62. The root pivot 62 may comprise a pintle and gudgeon, or axle and bearing, or other suitable rotational and load bearing, structure as are known to those skilled in the art. The root bolster 36 is a fixture configured to attach to the root end of the airfoil (not shown), as are known to those skilled in the art. The root end bolster 36 may comprise two portions, one that is fixed to and is transported together with the airfoil (not shown), and another portion that remains with the railcar, the two of which are bolted together at the time of loading, for example.

The tip end bolster 44 in FIG. 9 is supported by a bolster pivot 43 on a slide assembly 42. The tip end bolster 44 is configured to securely engage the airfoil (not shown), such as by employing a conformal shape and compression, or other means known to those skilled in the art. The slide assembly 42 slidably engages an expanded portion 52 of radius arm 40. This enables the slide 42 to slide along the expanded portion 52 in a generally linear and longitudinal direction. This sliding action accommodates changes in the longitudinal support spacing caused by triangulation as the railcars traverse curved sections of track. The radius arm 40 is rotatably connected to the railcar deck (not shown) by deck pivot 38. The deck pivot 38 may comprise a pintle and gudgeon or other suitable rotational structure as are known to those skilled in the art. As such, the distal end of the radius arm 40 swings along an arcuate path defined by the deck pivot 38 and the length of the radius arm 40, and which thereby defines a lateral path that the bolster pivot 43 and tip end bolster 44 must follow, in first and second lateral direction, which might also be referred to as the left and right. The tip end bolster 44 supports the weight of the airfoil (not shown) and this weight is, in turn, borne by a wheel assembly 54 located between the radius arm expanded portion 52 and the deck of the railcar (not shown). In this embodiment, the wheel assembly 54 comprises three wheels, as illustrated. Note that the angular orientation of the individual wheels 54 are aligned to follow the aforementioned arcuate path.

The radius arm 40 in FIG. 9 comprises an extension 56 at its distal end, which serves to engage either of a pair of deck stops 46. The deck stops 46 are located on either side of the radius arm extension 56, and serve to limit the extent of travel in the first and second lateral directions along the aforementioned arcuate path. A lock and latch assembly 58 is positioned about the extension 56, and serves two functions. In its default position, when the extension 56 does not engage either of the deck stops 46, the lock and latch assembly locks the angular relationship between the tip end bolster 44 and the slide 42 and radius arm expanded portion 52. While the extension 56 engages either of the deck stops 46, the latch function retains the extension 56 against that deck stop 46, which will be discussed more fully hereinafter. In the illustrative embodiment, the fixed angle is ninety degrees, however other angles may be useful. With the lock 58 in the locked condition, the blade orientation with respect to the railcars (not shown) and the root end bolster 36 is controlled by the deck pivot 38. In other words, the triangle formed by the two railcars and the blade is formed of three apexes, which are the root bolster pivot 62, the tip end pivot 38, and the railcar coupler (not shown) location between the two railcars (not shown).

FIG. 10 comports with FIG. 9, however in FIG. 10, the angular orientations are consistent with the railcars (not shown) traversing an eight-degree railway (not shown) curve. In this situation, the radius arm 40 extension 56 is just engaged with the right deck stop 46, this action causes the locking function of the lock and latch assembly 58 to release the lock so that the tip end bolster is free to rotate about the tip end pivot 43. In addition, the latch function of the lock and latch assembly 58 engages the right deck stop 46 and retains the radius arm 40 extension 56 together therewith. The latch function thereby stops any further rotation about the deck pivot 38. Hence the two-axis rotation function of the illustrative embodiment is realized. Note that in this condition, several angles and spacing characteristics are defined. By virtue of the aforementioned triangulations, the root end bolster 36 and pivot 62 have rotated a certain degree 65 as illustrated. In addition, the radius arm 40 and deck pivot 38 have rotated a certain degree 64. And, a lateral translation 62 of the tip end bolster pivot is also defined. All of these dimensions are subject to the logistic engineer's tuning calculations, as discussed hereinbefore. Note that at this instant, the tip end bolster has not yet begun to rotate about the tip end bolster pivot 43.

In FIG. 11, the train (not shown) of FIGS. 9 and 10 has reached a twenty-three degree curve (not shown). This further track curvature in FIG. 11 causes the tip end bolster 44 to rotate about the tip end pivot 43 because the latch function of the lock and latch assembly 58 prevents any further rotation about deck pivot 38. Therefore, the radius arm angle of rotation 64 does not change, and neither does the lateral offset 62 of the tip end bolster pivot 43 location. Rather, all of the triangulation rotation must be accommodated by the tip end bolster pivot 43 and the root end bolster pivot 62, which angles are illustrated as angle 67 being greater then angle 65 in FIG. 10, and the rotation angle 68 of the tip end bolster 44 as it rotates beyond the aforementioned ninety degree locked position. Again, the two-axis of rotation geometry is fully realized. Note that as the train (not shown) returns to straighter track (not show), the tip end bolster angle 68 returns to ninety degrees, and at that moment, the latch function of the lock and latch assembly 58 releases the radius arm extension 56 from the deck stop 46, and the tip end bolster 44 is again locked at the aforementioned ninety degree angle. Thusly enabling an automatic transfer between the two axes of rotation.

Figure 13:
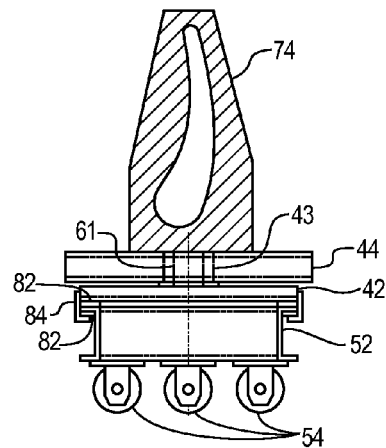
FIG. 13 is an end drawing of a blade mounting fixture according to an illustrative embodiment of the present invention.

Reference is directed to FIG. 12 and FIG. 13, which are a side view drawing and an end view drawing, respectively, of a blade mounting fixture according to an illustrative embodiment of the present invention. FIGS. 12 and 13 comport with FIGS. 9, 10, and 11. In FIG. 12, the deck pivot 38 is shown as being engaged between the radius arm 40 and a pintle 72 fixed to the railcar deck 70. Other rotational structures known to those skilled in the art can also be employed to achieve this function. The radius arm 40 extends to the expanded portion 52 of the radius arm 40, which is designed to slidably engage the slide assembly 42. The wheel assembly 54 is fixed to the bottom of the expanded portion 52 of the radius arm 40, and the wheels 54 rollably engage the railcar deck 70. Note that a steel deck plate (not shown) can be added to the railcar deck 70 to facilitate smooth lateral movement. The slide assembly 42 engages flanges in the expanded portion 52, and the flanges are lined with a suitable polymeric material 82, such as UHMW polyethylene, to reduce sliding friction. A retention bracket 84 is added to retain the slide assembly 42 on the expanded portion 52. The tip end bolster pivot 60 is disposed between the slide assembly 42 and the tip end bolster 44, and is configured as an axle and bearing 61 to support the laden and dynamic loads. The tip end bolster 44 further includes a blade engaging member 74, which provides a conformal fit to the blade (not shown), being transported. Note that the engaging member 74 is drawn in a generic format because the types of fixtures used in the industry vary widely and change from time to time, but most of them would be suitable for connection to the tip end bolster 44.

A radius arm 40 extension 56 extends beyond the expanded portion 52 in FIG. 13. As was discussed hereinbefore, the extension 56 engages the deck sops (not shown) to limit lateral movement of the radius arm 40. The lock and latch assembly 58 is coupled to the extension 56 using a guide pin 80 and provides the locking and latching function described hereinbefore. A latch pin 76 extends downward from the lock and latch assembly 58 and serves to engage an opening in the deck stops (not shown), and latches the radius arm 40 to the deck stops. A lock link 77 extends forward to the slide assembly 42 and a lock pin 78 extends upwardly to lock the tip end bolster 44 in a fixed angular relationship with the radius arm 40, thusly implementing the lock and latch functionality. Note however, as discussed hereinbefore, those skilled in the art will appreciate that there several mechanisms that could be employed to implement the lock and latch functionality, and the mechanism described in this illustrative embodiment should not be construed as limiting the scope of the present invention.

Reference is directed to FIG. 14, which is a drawing of a straight wind turbine blade 90 according to an illustrative embodiment of the present invention. While the use of straight blades is on the decline, this is an example of a wind turbine blade that follows a straight centerline contained fully within the blade 90. Note the root end 92 and the tip end 94. Also note that this blade 90 cannot be supported from the tip end directly, and that "tip end support" is actually accomplished by placing a bolster at some location between the root 92 and tip 94, which varies from blade to blade, and is sometimes referred to as the midsection. The root end 92 of this blade can be supported directly by placing a bolster at that location. This blade 90 will be used as an exemplar with respect to FIGS. 15, 16, and 17.

Reference is directed to FIG. 15, FIG. 16, and FIG. 17, which are drawings of a train carrying a wind turbine blade through varying degrees of curvature according to an illustrative embodiment of the present invention. FIG. 15 is a straight track, FIG. 16 is an eight-degree curve, and FIG. 17 is a twenty-three degree curve. The train consists to two flatcars 96, 98 that are coupled together and traverse a railroad (not shown). In FIG. 15, the flatcars 96, 98 are traversing a straight section of track. A radius arm 106 is utilized to support the root end of the blade 90 over the first railcar 96. The tip end of the blade 90 is supported above the second flatcar 98 using a pivot and slide assembly comprising items 100, 102, and 104. A slide base 100 is fixed to the deck of the railcar 98, and a slide unit 102 slidably engages the slide base 100. A tip end bolster 104 is rotatably coupled about a vertical axis to the slide unit 102 using a tip end pivot 101, which may comprise a axle and bearing as discussed hereinbefore. The blade 90 is firmly engaged with the tip end bolster 104. Thusly, the tip end of the blade 90 is supported above the railcar 98 to both rotate about tip end pivot 101 and slide fore and aft in a generally longitudinal direction with slide unit 102 so as to accommodate the aforementioned triangulation movement.

At the rood end of the blade 90 in FIGS. 15, 16, and 17, a radius arm 106 is coupled to the deck of the railcar 96 using a deck pivot 108, which may comprise a pintle and gudgeon as discussed hereinbefore. A root bolster 110 is rotatably coupled to the radius arm by root pivot 114. The root bolster 110 supports the weight of the blade 90. The radius arm 106 extends past the root bolster to engage either of a pair of deck stops 112, which server to limit the lateral travel of the radius arm 106 as it rotates about deck pivot 108. The radius arm 106 is generally aligned with the longitudinal centerline flatcar 96 as it travels on a straight track by virtue of the stiffness of the blade 90, which is held in position by the root bolster 110 and the tip end bolster 104.

FIG. 16 illustrates the same train as FIG. 15, but in FIG. 16, the track (not shown) has an eight-degree curve so the flatcars 96, 98 are no longer aligned in a straight line. The blade 90 defines a straight line between the root bolster 110 and the tip end bolster 104. The tip end bolster 104 firmly engages the blade 90. Since the root end bolster 110 is locked in a fixed angular relationship with the radius arm 106, the group of these items are forced to rotate about the deck pivot point 108, as illustrated. This action drives the root end of the blade 90 toward the outside of the curve and the middle of the blade 2 toward the inside of the curve. Note that the blade overhang remains within the width of the flatcars 96, 98, so there are no profile clearance issues at this degree of track curvature. Also note that the end of the radius arm 106 is just beginning to engage one of a pair of deck stops 112 that are fixed to the deck of the flatcar 96. When the radius arm 106 fully engages the deck stop 112, a lock release (not shown) is actuated, which enables the root end bolster 110 to rotate with respect to the radius arm 106 about a deck pivot 108. Also note in FIG. 16 that the bolsters 104, 110 firmly hold the blade 90. This implies that the distance between the bolsters 104, 110 2 is a fixed length. Since the triangulation that occurs by virtue of the misalignment of the cars 96, 98 shortens the distance between the components fixed to the cars, there must be some longitudinal accommodation. The slide assembly 100, 102 addresses this length change, and FIGS. 15, 16, 17 illustrated this movement. The adjustment length of the slide assembly 100, 102 is also tuned for the particular embodiment.

FIG. 17 follows FIG. 15 and FIG. 16, and FIG. 17 illustrated the cars 96, 98 as they traverse a twenty-three degree curvature in the track (not shown). In this drawing, the radius arm 106 has fully engaged the left deck stop 112, so a lock release (not shown) has released a bolster pivot 114 to enable the root end bolster 110 to rotate with respect to the radius arm 106. In addition, a latch (not shown) is cooperatively coupled with the lock release, and maintains the radius arm 106 against the deck stop 112. Thus, the radius arm 106 cannot rotate about the deck pivot 108 while the bolster 110 is allowed to rotate about the bolster pivot 114. Note that that the blade 90 overhangs at the tip end 116 and along the middle 115. These distances are reduced as compared to the same blade where the root end bolster is not allowed to rotate about the bolster pivot 114. The length of the radius arm 106 and the location of the deck pivot 108 are tuned by logistics engineers to control these two overhangs 115, 116 to enable the least detrimental configuration from a railroad clearance profile perspective. When the flatcars 96, 98 return to a straight section of track, the root end bolster 110 returns to the fixed angular relationship with the radius arm 106, and radius arm is then urged away from the deck stop 112, and this action releases the aforementioned latch and reengages the aforementioned lock. In this manner, the system is enabled to transition between straight and curved track sections and automatically control the rotation about the deck pivot 108 and the tip end pivot 101.

Reference is directed to FIG. 18, FIG. 19, and FIG. 20, which are drawings of a blade mounting fixture assembly according to an illustrative embodiment of the present invention. FIG. 18 illustrates the angular configuration on a straight track, FIG. 19 illustrates the angular configuration on an eight-degree curve, and FIG. 20 illustrates the angular configuration on a twenty-three degree curve. Note that the slide base 100, slide unit 102, tip end pivot 103, and tip end bolster 104 have already been discussed in regards to FIGS. 15, 16, and 17. The root end bolster 110 is supported by a root pivot 114 on a radius arm 106. The radius arm 106 is rotatably connected to the railcar deck (not shown) by deck pivot 108. The deck pivot 108 may comprise a pintle 109 and gudgeon or other suitable rotational structure as are known to those skilled in the art. As such, the distal end of the radius arm 106 swings along an arcuate path defined by the deck pivot 108 and the length of the radius arm 106, and which thereby defines a lateral path that the root bolster pivot 114 must follows, in first and second lateral direction, which might also be referred to as the left and right. The root end bolster 110 supports the weight of the airfoil (not shown) and this weight is, in turn, borne by a wheel assembly 118 located between the radius arm 106 and the deck of the railcar (not shown). In this embodiment, the wheel assembly 118 comprises three wheels, as illustrated. Note that the angular orientation of the individual wheels 118 are aligned to follow the aforementioned arcuate path.

The radius arm 106 comprises an extension 123 at its distal end, which serves to engage either of a pair of deck stops 112. The deck stops 112 are located on either side of the radius arm 106 extension 123, and serve to limit the extent of travel in the first and second lateral directions along the aforementioned arcuate path. A lock and latch assembly 120 is positioned about the radius arm 106 extension 123, and serves two functions. In its default position, when the extension 123 does not engage either of the deck stops 112, the lock and latch assembly locks the angular relationship between the root end bolster 110 and the radius arm 106. While the extension 123 engages either of the deck stops 112, the latch function retains the extension 123 against that deck stop 112, which will be discussed more fully hereinafter. In the illustrative embodiment, the fixed angle is ninety degrees, however other angles may be useful. With the lock 120 in the locked condition, the blade orientation with respect to the railcars (not shown) and the root end bolster 110 is controlled by the deck pivot 108. In other words, the triangle formed by the two railcars and the blade is formed of three apexes, which are the root bolster pivot 114, the tip end pivot 103, and the coupler (not shown) location between the two railcars (not shown).

FIG. 19 comports with FIG. 18, however in FIG. 19, the angular orientations are consistent with the railcars (not shown) traversing an eight-degree railway (not shown) curve. In this situation, the radius arm 106 extension 123 is just engaged with the right deck stop 112, this action causes the locking function of the lock and latch assembly 121 to release the lock from tab 121 on root bolster 110 so that the root end bolster 110 is free to rotate about the root end pivot 114. In addition, the latch function of the lock and latch assembly 120 engages the right deck stop 112 and retains the radius arm 106 extension 123 together therewith. The latch function thereby stops any further rotation about the deck pivot 108. Hence the two-axis rotation function of the illustrative embodiment is realized. Note that in this condition, several angles and spacing characteristics are defined. By virtue of the aforementioned triangulations, the tip end bolster 104 and pivot 103 have rotated a certain degree 101 as illustrated. In addition, the radius arm 106 and deck pivot 108 have rotated a certain degree 109. And, a lateral translation 107 of the root end bolster pivot is also defined. All of these dimensions are subject to the logistic engineer's tuning calculations, as discussed hereinbefore. Note that at this instant, the root end bolster 110 has not yet begun to rotate about the root end bolster pivot 114.

In FIG. 20, the train (not shown) of FIGS. 18 and 19 has reached a twenty-three degree curve (not shown). This further track curvature in FIG. 20 causes the root end bolster 110 to rotate about the root end pivot 114 because the latch function of the lock and latch assembly 120 prevents any further rotation about deck pivot 108. Therefore, the radius arm angle of rotation 109 does not change, and neither does the lateral offset 107 of the root end bolster pivot 114 location. Rather, all of the triangulation rotation must be accommodated by the root end bolster pivot 114 and the tip end bolster pivot 103, which angles are illustrated as angle 105 being greater then angle 101 in FIG. 19, and the rotation angle 113 of the root end bolster 110 as it rotates beyond the aforementioned ninety degree locked position. Again, the two-axis of rotation geometry is fully realized. Note that as the train (not shown) returns to straighter track (not show), the root end bolster angle 113 returns to ninety degrees, and at that moment, the latch function of the lock and latch assembly 120 releases the radius arm extension 123 from the deck stop 112, and the root end bolster 110 is again locked at the aforementioned ninety degree angle. Thusly enabling an automatic transfer between the two axes of rotation.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for transporting an airfoil, having a first and second end, utilizing a first railcar coupled to a second railcar, the system comprising:
   - a radius arm that extends between a first deck pivot and a first bolster pivot;
   - said first deck pivot rotatably coupled to the first railcar about a first vertical axis, to enable transverse movement of said first bolster pivot along an arcuate path in either of a first or second transverse direction;
   - a first deck stop and a second deck stop, both fixed to the first railcar, and positioned on either side of said radius arm to limit lateral movement of said first bolster pivot;
   - a first bolster, configured to support the airfoil adjacent to the first end, rotatably coupled to said radius arm about a second vertical axis by said first bolster pivot;
   - a wheel assembly disposed between said radius arm and the first rail car to support weight of said first bolster and the airfoil as they laterally translate between said first and second transverse directions;
   - a bolster lock disposed between said radius arm and said first bolster to maintain a fixed angular relationship therebetween;
   - a lock release coupled to disengage said bolster lock, thereby enabling rotation of said first bolster with respect to said radius arm, and wherein
   - said first and second deck stops are positioned to actuate said lock release at said limits of movement in said first and second transverse directions;
   - a latch cooperatively coupled with said lock release to maintainably retain said radius arm with either of said first deck and second deck stops while said bolster lock is disengaged, and
   - a second bolster disposed adjacent to the second end of the airfoil to support the airfoil above the second railcar.

2. The system of claim 1, and wherein:
   said bolster lock reengages upon return of said first bolster to said fixed angular relationship with said radius arm, and which further cooperatively releases said latch to enable movement of said radius arm and said second bolster away from either of said first or second deck stops.

3. The system of claim 1, and wherein:
   said first deck pivot further comprises a pintle and a gudgeon disposed between the first railcar and said radius arm, and wherein
   said first bolster pivot further comprises an axle and a bearing disposed between said radius arm and said first bolster.

4. The system of claim 1, and wherein:
   said wheel assembly further comprise plural wheels fixed to said radius arm that are oriented and aligned to roll along said arcuate path.

5. The system of claim 1, and further comprising:
   a bearing plate fixed to the first railcar upon which said wheel assembly rolls.

6. The system of claim 1, and wherein said second bolster further comprises:
   a second bolster pivot disposed between the second railcar and said second bolster to accommodate airfoil alignment changes as the first and second railcars traverse a railroad.

7. The system of claim 1, further comprising:
   a slide assembly disposed between the second railcar and said second bolster, which enables longitudinal movement of said second bolster with respect to the second railcar, thereby allowing for changes in distance between said first bolster and said second bolster that occur as the first and second railcars traverse a railroad.

8. The system of claim 1, further comprising:
   a slide assembly disposed between said radius arm and said first bolster, which enables longitudinal movement of said first bolster with respect to the first railcar, thereby allowing for changes in distance between said first bolster and said second bolster that occur as the first and second railcars traverse a railroad.

9. The system of claim 8, and wherein:
   said slide assembly is disposed between said radius arm and said first bolster pivot.

10. The system of claim 8, and wherein:
said slide assembly is disposed between said first bolster pivot and said first bolster.

11. The system of claim 1, and wherein the first end of the airfoil is the root end, and the second end of the airfoil is a mid section adjacent to the tip end.

12. The system of claim 1, and wherein the first end of the airfoil is a mid section adjacent to the tip end and the second end of the airfoil is the root end.

13. The system of claim 1, and wherein:
said first deck pivot is positioned between said first bolster pivot and said second bolster.

14. The system of claim 1, and wherein:
said first bolster pivot is positioned between said first deck pivot and said second bolster.

15. The system of claim 1, and wherein a third railcar is disposed between the first railcar and the second railcar.

16. A method for transporting an airfoil, having a first and second end, utilizing a first railcar coupled to a second railcar, comprising the step of:
connecting a first deck pivot to the first railcar;
connecting the deck pivot to a radius arm about a first vertical axis, wherein the radius arm extends from the first deck pivot to a first bolster pivot, thereby enabling transverse movement of the first bolster pivot along an arcuate path in either of a first or second transverse direction;
attaching a first deck stop and a second deck stop to the first railcar on either side of the radius arm, thereby limiting lateral movement of the first bolster pivot;
attaching a first bolster to the first bolster pivot about a second vertical axis, and supporting the airfoil with the first bolster adjacent to the first end;
positioning a wheel assembly between the radius arm and the first rail car, thereby supporting weight of the first bolster and the airfoil as they are laterally translating between the first and second transverse directions;
disposing a bolster lock between the radius arm and the first bolster, thereby maintaining a fixed angular relationship therebetween;
positioning a lock release such that the first and second deck stops actuate the lock release when the radius arm reaches the limits of movement in the first and second transverse directions, and wherein the lock release actuation disengages the bolster lock, thereby enabling rotation of the first bolster with respect to the radius arm;
cooperatively coupling a latch with the lock release for maintainably retaining the radius arm with either of the first deck or second deck stops while the bolster lock is disengaged, and
supporting the second end of the airfoil above the second railcar by attaching a second bolster to the second railcar adjacent to the second end of the airfoil.

17. The method of claim 16, further comprising the steps of:
reengaging the bolster lock upon returning the first bolster to the fixed angular relationship with the radius arm, and
cooperatively releasing the latch for enabling movement of the radius arm and the second bolster away from either of said first and second deck stops.

18. The method of claim 16, wherein the wheel assembly includes plural wheels, further comprising the step of:
orienting the plural wheels for rolling along the arcuate path.

19. The method of claim 16, and further comprising the steps of:
attaching a bearing plate to the first railcar, and rolling the wheel assembly on the bearing plate.

20. The method of claim 16, further comprising the steps of:
connecting a second bolster pivot between the second railcar and the second bolster, thereby accommodating airfoil alignment changes as the first and second railcars traverse a railroad.

21. The method of claim 16, further comprising the steps of:
connecting a slide assembly between the second railcar and the second bolster, thereby enabling longitudinal movement of the second bolster with respect to the second railcar, and allowing for changes in distance between the first bolster and the second bolster that occur as the first and second railcars traverse a railroad.

22. The method of claim 16, further comprising the steps of:
connecting a slide assembly between the radius arm and the first bolster, thereby enabling longitudinal movement of the first bolster with respect to the first railcar, and allowing for changes in distance between the first bolster and the second bolster that occur as the first and second railcars traverse a railroad.

23. The method of claim 16, further comprising the step of:
positioning the first deck pivot between the first bolster pivot and the second bolster.

24. The method of claim 16, further comprising the step of:
positioning the first bolster pivot between the first deck pivot and the second bolster.

25. The method of claim 16, further comprising the step of:
coupling a third railcar between the first railcar and the second railcar.

* * * * *